United States Patent
Schauerhofer

(10) Patent No.: US 9,468,139 B2
(45) Date of Patent: Oct. 18, 2016

(54) IMPLEMENT HITCH FOR A TRACTOR

(71) Applicant: CNH Industrial America LLC, New Holland, PA (US)

(72) Inventor: Franz Schauerhofer, Sankt Martin (AT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/533,584

(22) Filed: Nov. 5, 2014

(65) Prior Publication Data
US 2015/0122517 A1    May 7, 2015

(30) Foreign Application Priority Data
Nov. 6, 2013  (IT) .............................. MO2013A0306

(51) Int. Cl.
*A01B 59/041*  (2006.01)
*B60D 1/00*    (2006.01)

(52) U.S. Cl.
CPC ......... *A01B 59/0415* (2013.01); *A01B 59/041* (2013.01); *B60D 2001/008* (2013.01)

(58) Field of Classification Search
CPC .......................... A01B 59/041; A01B 59/0415
USPC ........................................................ 172/450
See application file for complete search history.

(56) References Cited

U.S. PATENT DOCUMENTS

| | | | | |
|---|---|---|---|---|
| 2,531,768 A * | 11/1950 | Cline | ................. | B62D 49/0614 172/248 |
| 2,775,176 A * | 12/1956 | Gibson | ................. | A01B 63/10 172/460 |
| 3,056,458 A * | 10/1962 | Gray | .................... | A01B 59/004 172/239 |
| 4,108,463 A * | 8/1978 | Old | ........................ | B60D 1/155 172/450 |
| 4,214,636 A * | 7/1980 | Griffith | ................ | A01B 59/062 172/450 |
| 4,865,134 A * | 9/1989 | Rugen et al. | ........ | A01B 59/041 172/450 |
| 5,361,850 A * | 11/1994 | Muller et al. | ........ | A01B 59/041 172/439 |
| 5,462,303 A | 10/1995 | Langen | | |
| 6,915,862 B2 * | 7/2005 | Deves et al. | ........... | B62D 49/02 172/448 |

FOREIGN PATENT DOCUMENTS

| | | |
|---|---|---|
| DE | 4227399 | 2/1994 |
| FR | 2577376 | 8/1986 |
| GB | 647622 | 12/1950 |

OTHER PUBLICATIONS

Italian Search Report 10 43380 / IT MO20130306, Dated Jul. 10, 2014. (7 pages).

* cited by examiner

*Primary Examiner* — Thomas B Will
*Assistant Examiner* — Joel F Mitchell
(74) *Attorney, Agent, or Firm* — Rickard K. DeMille

(57) ABSTRACT

An implement hitch is disclosed for a tractor, wherein the hitch is fitted with a mechanism for stabilizing lateral movement of lifting arms of the hitch. The lifting arms are raised and lower by respective hydraulic cylinders. The stabilizing mechanism has a locking pin that is automatically retracted to an unlocked position by means of a flexible linkage when the lifting arms are in a lowered position. In the invention, the opposite end of the flexible linkage from the locking pin is connected to an anchoring point provided on the hydraulic cylinder serving to raise and lower one of the lifting arms.

11 Claims, 2 Drawing Sheets

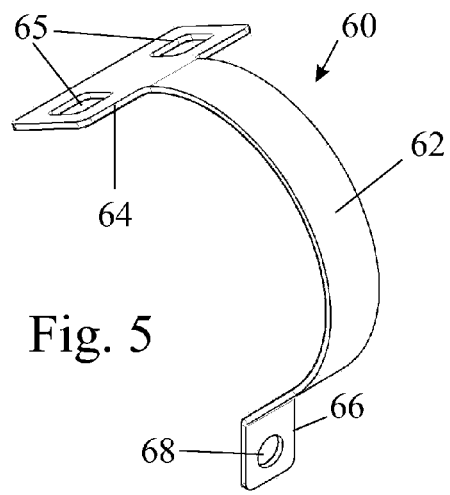
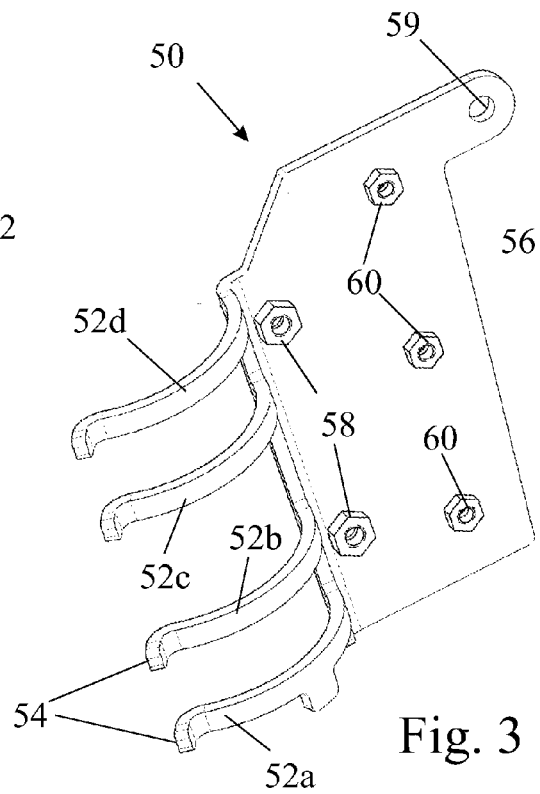
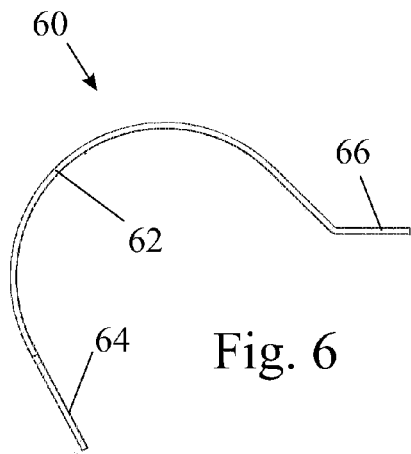
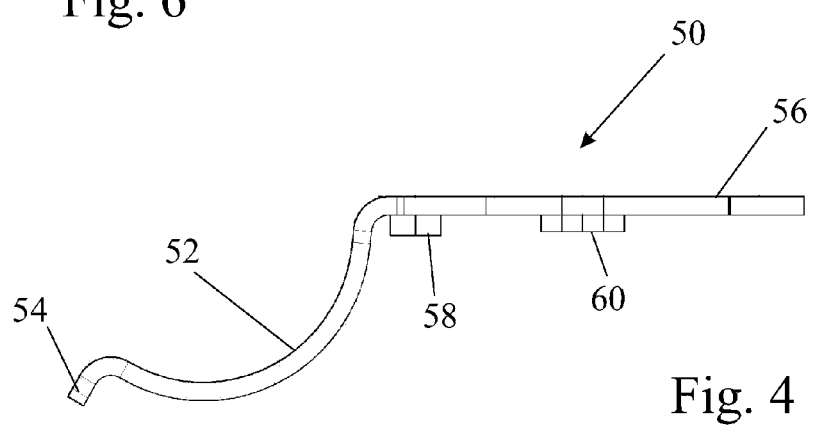

IMPLEMENT HITCH FOR A TRACTOR

CROSS REFERENCE TO RELATED APPLICATIONS

This patent application claims priority from and the benefit of Italian Patent Application Serial No. MO2013A000306, entitled "IMPLEMENT HITCH FOR A TRACTOR", filed Nov. 6, 2013, which is hereby incorporated by reference in its entirety.

FIELD OF THE INVENTION

The present invention relates to an implement hitch for a tractor, the hitch being fitted with a mechanism for stabilising lateral movement of lifting arms of the hitch.

BACKGROUND OF THE INVENTION

Tractors are commonly fitted with a three-point hitch to allow an implement, such as a plough or a harrow, to be connected to them. A three-point hitch comprises three movable arms, namely two lower lifting arms and an upper arm, that is also termed a top link, positioned centrally in relation to the lifting arms. The two lifting arms are raised and lowered by hydraulic cylinders that allow the towed implement to be raised, lowered or tilted. The top link is also movable but it is not usually hydraulically powered.

In a lowered position, the lifting arms should be allowed to move laterally from side to side. However, in a raised position, that is used for example when towing an implement on metalled roads, the lifting arms should be prevented from moving laterally in order to prevent yawing, or fish-tailing, of the implement.

To meet these needs, a stabilising mechanism is connected to the lifting arms, an example of a stabilising mechanism being shown in FIG. 1 of U.S. Pat. No. 5,462,303.

The stabilising mechanism includes a sprung telescopically collapsible strut, connected between one of the lifting arms and the tractor chassis. In the lowered position of the lifting arms, the two ends of the strut can move relative to one another against the action of the springs, so that the lifting arms are biased by the springs of the strut into the central position but are still capable of moving from side to side.

A lockable strut is connected between the other lifting arm and the tractor chassis. Though a separate strut is described in U.S. Pat. No. 5,462,303, the sprung telescopically collapsible strut may itself be lockable. The lockable strut is formed of two members that can slide, for example telescopically, relative to one another when the lifting arms are lowered but are prevented by a locking pin from moving relative to one another when the lifting arms are raised so as to lock the lifting arms of the hitch in a central position, symmetrical about the longitudinal axis of the tractor.

The locking pin of the lockable strut is biased towards its locked position and is attached by a flexible linkage, hereinafter often referred to as a chain though it may alternatively be a cable, to a point on the tractor chassis. The length of the chain is selected such that, when the lifting arms are lowered, the chain becomes taut and automatically retracts the locking pin to allow free lateral movement of the lifting arms.

In order to retract the locking pin smoothly and without risk of damage, it is desirable for the tension of the chain to act along the axis of movement of the locking pin, which is generally substantially vertical. However, as can be seen from FIG. 1 of U.S. Pat. No. 5,462,303, there is usually no convenient fixing point on the tractor chassis that is aligned with the axis of the locking pin and a compromise position needs to be adopted for anchoring the opposite end of the chain, the position being selected to be as close as possible to the line of action of the locking pin.

OBJECT OF THE INVENTION

The present invention seeks to provide a better way of anchoring the chain connected to the locking pin of a stabilising mechanism, to unlock the stabilising mechanism automatically as the lifting arms of the hitch are lowered.

SUMMARY OF THE INVENTION

According to the present invention, there is provided an implement hitch for a tractor, wherein the hitch is fitted with a mechanism for stabilising lateral movement of lifting arms of the hitch, which lifting arms are connected to be raised and lowered by respective hydraulic cylinders, and wherein the stabilising mechanism has a locking pin that is automatically retracted to an unlocked position by means of a flexible linkage when the lifting arms are in a lowered position, characterised in that the opposite end of the flexible linkage from the locking pin is connected to an anchoring point provided on the hydraulic cylinder serving to raise and lower one of the lifting arms.

The invention takes advantage of the fact the line of action of the locking pin of the stabilising mechanism, that is to say the axis movement of the locking pin, is substantially directly beneath one of the hydraulic cylinders acting to raise and lower the lifting arms of the hitch. By correctly positioning the anchoring point of the opposite end of the chain on the hydraulic cylinder, the invention ensures that the tension in the chain acts substantially in line with the axis of movement of the locking pin and thereby avoids lateral stresses on the pin that make it more difficult to move and risk it being distorted in the process.

In some embodiments, the anchoring point for the opposite end of the chain is provided by a clamp encircling and gripping the hydraulic cylinder, the clamp having an eyelet projecting from the surface of the hydraulic cylinder within which the opposite end of the chain may be engaged.

Hydraulic cylinders are usually of circular cross section and the clamp of an embodiment of the invention is therefore also of circular section. This allows the clamp to be oriented such that the eyelet lies as closely as possible to the line of action of the locking pin.

Conveniently, the clamp may comprise a first component having a part-cylindrical portion to engage the surface of the hydraulic cylinder and a radially projecting flat portion formed with a hole to serve as the eyelet for receiving the opposite end of the flexible linkage, and of at least one second component having a curved portion connectable to the curved portion of the first component to encircle the remainder of the circumference of the hydraulic cylinder and a flat portion securable to the flat portion of the first component to clamp the hydraulic cylinder between the two components.

The curved portions of the two components may be pivotably connected to one another but more simply the curved portion of one of the components may terminate in a bent tongue or hook to engage releasably within an opening in the end of the curved portion of the other component. In this way, the clamp may be formed of stamped sheet metal parts that are only interlocked with one another during assembly about the hydraulic cylinder.

If desired, additional fixing holes may be provided in the radially projecting flat portion of the at least one of the two components to receive attachments of other ancillary equipment.

BRIEF DESCRIPTION OF THE DRAWINGS

The invention will now be described further, by way of example, with reference to the accompanying drawings, in which:

FIG. 3 is a perspective view of a first component of a clamp fitted to a hydraulic cylinder of the hitch in FIGS. 1 and 2, FIG. 4 is a side view of the clamp component shown in FIG. 3, FIG. 5 is a perspective view of a second component of the clamp fitted to a hydraulic cylinder of the hitch in FIGS. 1 and 2, and FIG. 6 is a side view of the clamp component shown in FIG. 5.

DETAILED DESCRIPTION OF THE INVENTION

Figure 1:
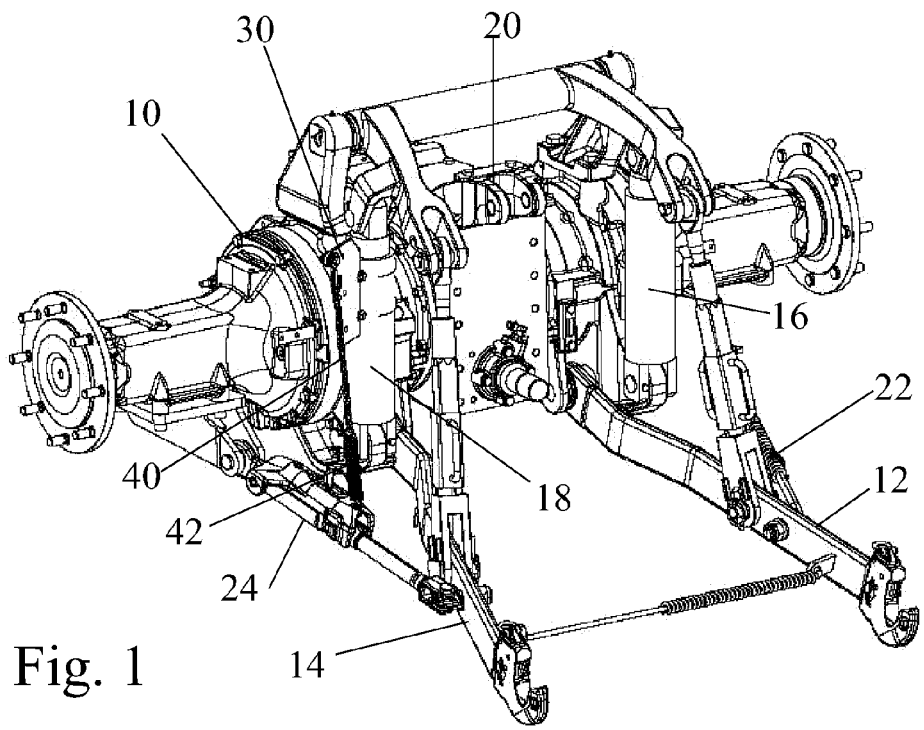
FIG. 1 is a perspective view of an implement hitch.
Figure 2:
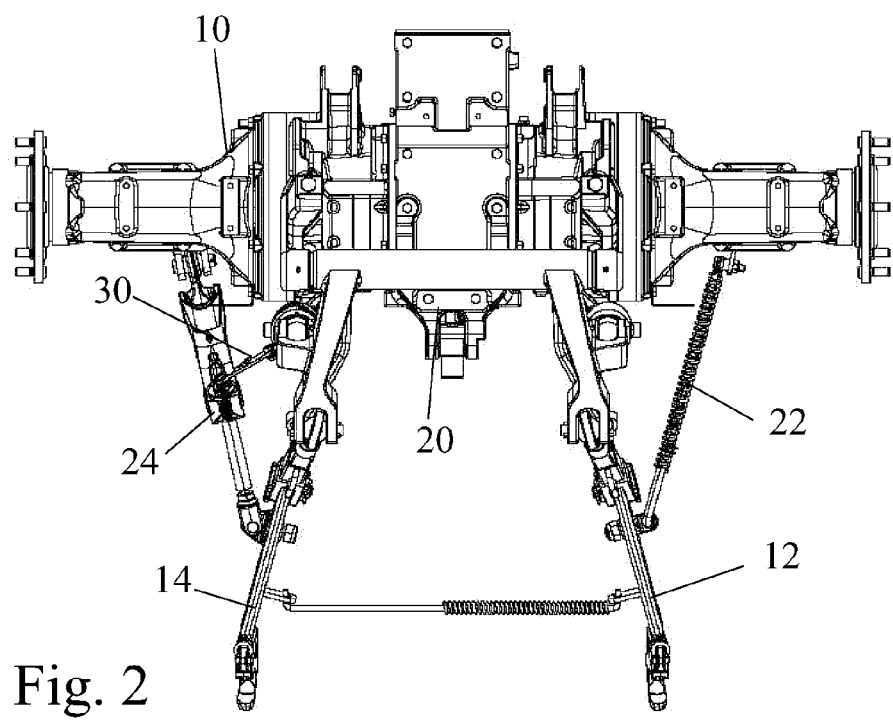
FIG. 2 is a plan view of the implement hitch of FIG. 1.

FIGS. 1 and 2 show the rear axle 10 of a tractor fitted with a three-point hitch. The hitch has two lower arms 12 and 14 that can be raised and lowered by means of respective hydraulic cylinders 16 and 18. The lifting arms 12 and 14 each form part of a parallelogram-like linkage that enables the ends of the lifting arms 12 and 14 to move through a greater distance than the stroke of their hydraulic cylinders 16 and 18. The mounting bracket 20 for the top link of the hitch may be seen in FIG. 1 but the top link itself has been omitted in the interest of clarity.

As more clearly shown in FIG. 2, a sprung strut 22 is connected to the lifting arm 12 and a lockable strut 24 is connected to the lifting arm 14. Both of these struts are telescopically collapsible and together form a stabilising mechanism that controls lateral movement of the lifting arms 12 and 14, that is to say movement from side to side as viewed in FIG. 2.

The sprung strut 22 serves to bias the lifting arms 12 and 14 into a central position while allowing them to move from side to side when in their lowered position.

The lockable strut 24 serves no purpose in the lowered position of the lifting arms 12 and 14 because in that position a locking pin of the strut 24 is retracted to allow the strut to change in length freely. However, in the raised position of the lifting arms 12 and 14, the locking pin of the strut 24 moves to a position in which it prevents expansion and contraction of the strut 24, thereby holding the lifting arms 12, 14 rigidly in their central position and preventing their lateral movement.

In larger type of tractors often a second lockable strut 24 is used to control movement of lifting arm 14, instead of sprung strut 22.

As so far described, the three-point hitch and the stabilising mechanism are conventional and their construction and operation will be clear to the person skilled in the art without the need for more detailed explanation.

The locking pin of the lockable strut 24 is conventionally connected by a fixed length flexible linkage, usually a chain, to a point on the rear axle 10 of the tractor. Because of the position of the locking pin relative to the rear axle 10, the chain is obliged to adopt a position that is inclined relative to the axis of movement of the locking pin. This makes the locking pin more difficult to move and can cause damage to the pin through wear and distortion.

The present invention seeks to overcome these problems by providing an anchoring point for the opposite end of the chain that is at least substantially in line with the line of action of the locking pin.

The anchoring point in the invention is provided by a clamp 30 that is fitted around the hydraulic cylinder 18. The clamp 30, to be described in more detail below by reference to FIGS. 3 to 6, has a radially projecting plate with an eyelet for receiving an end of the chain 40 which is connected to the locking pin of the lockable strut 24 by means of a spring 42. The plate can be dimensioned and oriented so that the eyelet lies directly in line with the axis of movement of the locking pin.

The clamp 30 is formed of a first component shown in FIGS. 3 and 4 and two identical second components shown in FIGS. 5 and 6. The first component 50 has a curved portion 52 made up of four fingers 52a to 52d having a curvature matching that of the hydraulic cylinder 18 and extending over an angle of about 120°. The ends of fingers 52a to 52d have bent over tongues 54. The first component 50 also has a flat portion 56 that projects radially from the cylinder 18 and includes a projecting eyelet 59 for engaging with the release chain 40 of the locking pin. Various holes are formed in the flat portion 56 onto which nuts 58 and 60 are welded. A notch on first component 50 can be used to position and orient first component 50 on cylinder 18. Consequently a mirrored version of first component 50 may be used so that the notch also fits on the second, mirrored lifting cylinder. The second components 60 of the clamp as shown in FIGS. 5 and 6 have a curved portion 62 and a flat portion 66. The curved portion 62 is in the form of a narrow strap that terminates at one end in a flange 64 formed with two rectangular openings 65. At its other end, the strap 62 is connected to the flat portion 66 which is formed with a hole 68 for receiving a bolt.

To fit the clamp 30 to the cylinder 18, the four fingers 52a to 52d of the curved portion 52 of the first component 50 are first placed against the outside of the cylinder 18. The openings 65 in the flange 64 of a second component 60 are then slipped over two of the tongues 54 and the curved strap 62 is positioned to encircle the cylinder 18. A bolt is passed through the hole 68 and screwed into a nut 58 to hold the clamp in place. The other second component is next mounted in the same manner and after the clamp has been rotated to orient the flat portion 56 correctly, the bolts are tightened. The release chain may then be engaged in the eyelet 59.

The spring 42 limits the force that can be applied to the locking pin, thereby avoiding the pin being damaged if the chain should accidentally snag an object. It also limits the force pulling down on the clamp 30 to prevent it from being dislodged.

The nuts 60 are provided on the flat portion 56 for other ancillary equipment or tools that may require a convenient anchoring point but are not relevant to the stabilising mechanism.

A further advantage of anchoring the locking pin release chain to a hydraulic cylinder rather than the rear axle is that the chain is moved further away from the wheels of the tractor and is therefore less likely to gather dirt that is thrown up by the tractor wheels.

The invention claimed is:

1. An implement hitch for a tractor, the tractor including a chassis, the implement hitch comprising:
   a first lifting arm and a second lifting arm;
   a first hydraulic cylinder coupled to the first lifting arm and a second hydraulic cylinder coupled to the second lifting arm, the first and second hydraulic cylinders configured to raise and lower the first and second lifting arms;
   a first strut coupled between the first lifting arm and the chassis of the tractor;
   a second strut coupled between the second lifting arm and the chassis of the tractor, the second strut being lockable to prevent lateral movement of the first and second lifting arms when the first and second lifting arms are moved to a raised position;
   a clamp assembly coupled to one of the first hydraulic cylinder or the second hydraulic cylinder, the clamp assembly including a first clamp component and a second clamp component, the first and second clamp components being coupled end-to-end such that the clamp assembly encircles the one of the first hydraulic cylinder or the second hydraulic cylinder; and
   a flexible linkable extending between a first end coupled to a portion of the second strut and a second end coupled at an anchoring point defined by the clamp assembly.

2. The implement hitch of claim 1, wherein each of the first and second struts corresponds to a telescoping strut.

3. The implement hitch of claim 1, wherein the flexible linkage includes a spring extending from the first end towards the second end of the flexible linkage and a chain extending between the spring and the second end of the flexible linkage.

4. The implement hitch of claim 1, wherein the first clamp component includes a curved portion and a flat portion extending outwardly from the curved portion such that the flat portion projects radially outwardly from the one of the first hydraulic cylinder or the second hydraulic cylinder.

5. The implement hitch of claim 4, wherein the flat portion of the first clamp component defines an eyelet for coupling the second end of the flexible linkage to the clamp assembly.

6. The implement hitch of claim 4, wherein the curved portion of the first clamp component is formed from a plurality of curved fingers, each of the plurality of curved fingers having a curvature corresponding to a curvature of the one of the first hydraulic cylinder or the second hydraulic cylinder.

7. The implement hitch of claim 6, wherein an end of at least one of the plurality of curved fingers includes an outwardly bent tongue, the tongue being received within a portion of the second clamp component.

8. The implement hitch of claim 4, wherein the second clamp component includes a second curved portion extending between a flange and a second flat portion, the flange configured to be coupled to the curved portion of the first clamp component and the second flat portion configured to be coupled to the flat portion of the first clamp component.

9. The implement hitch of claim 8, wherein the second curved portion of the second clamp component has a curvature corresponding to a curvature of the one of the first hydraulic cylinder or the second hydraulic cylinder.

10. The implement hitch of claim 8, wherein the flange of the second clamp component defines at least one opening configured to receive an outwardly bent tongue of the curved portion of the first clamp component such that the first and second clamp components are pivotally coupled to one another at the flange.

11. The implement hitch of claim 8, wherein the second flat portion of the second clamp component defines at least one opening for receiving a fastener, the fastener configured to couple the second flat portion to the flat portion of the first clamp component.

* * * * *